No. 745,272. PATENTED NOV. 24, 1903.
C. BORNMANN.
PHOTOGRAPHIC SHUTTER.
APPLICATION FILED MAR. 14, 1903.
NO MODEL. 2 SHEETS—SHEET 1.

Witnesses
Edward Rowland.

Inventor
Carl Bornmann
By his Attorney
Phillips Abbott

No. 745,272. PATENTED NOV. 24, 1903.
C. BORNMANN.
PHOTOGRAPHIC SHUTTER.
APPLICATION FILED MAR. 14, 1903.
NO MODEL. 2 SHEETS—SHEET 2.

Witnesses
Edward C. Rowland

Inventor
Carl Bornmann
By his Attorney
Phillips Abbott

No. 745,272. Patented November 24, 1903.

UNITED STATES PATENT OFFICE.

CARL BORNMANN, OF NEW HAVEN, CONNECTICUT, ASSIGNOR TO THE ANTHONY & SCOVILL COMPANY, OF NEW YORK, N. Y., A CORPORATION OF NEW YORK.

PHOTOGRAPHIC SHUTTER.

SPECIFICATION forming part of Letters Patent No. 745,272, dated November 24, 1903.

Application filed March 14, 1903. Serial No. 147,744. (No model.)

*To all whom it may concern:*

Be it known that I, CARL BORNMANN, a citizen of the United States, and a resident of the city of New Haven, county of New Haven, State of Connecticut, have invented certain new and useful Improvements in Photographic Shutters, of which the following is a full, clear, and exact description, reference being had to the accompanying drawings, in which—

Figure 1:
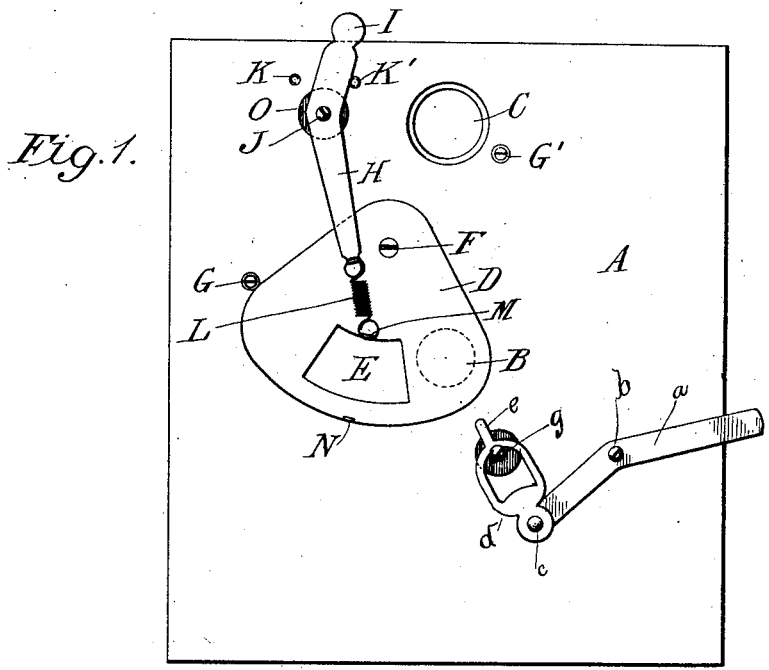
Figure 2:
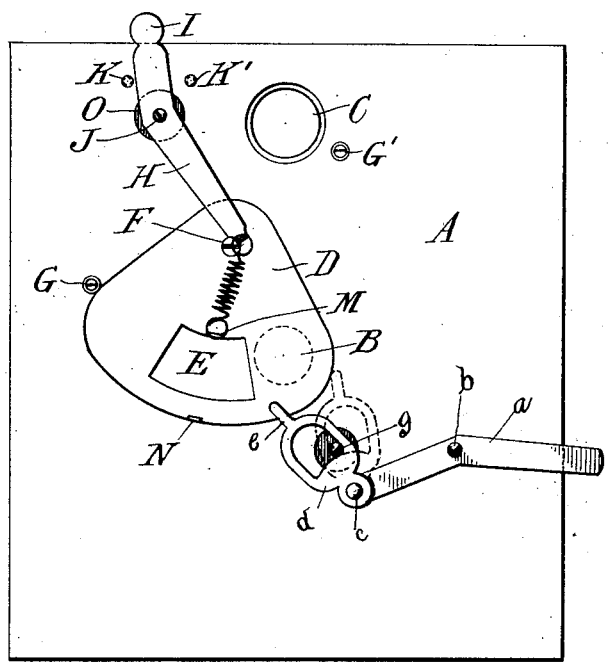
Figure 3:
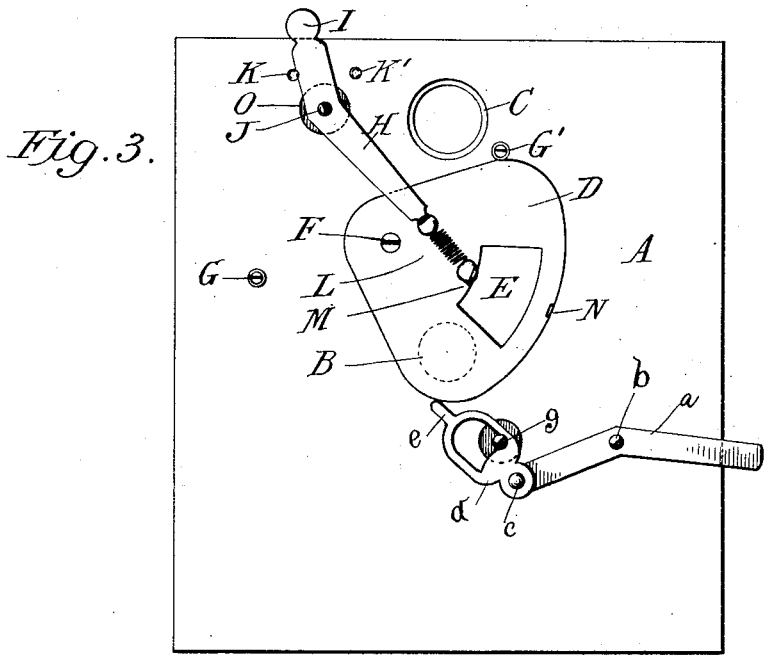
Figure 4:
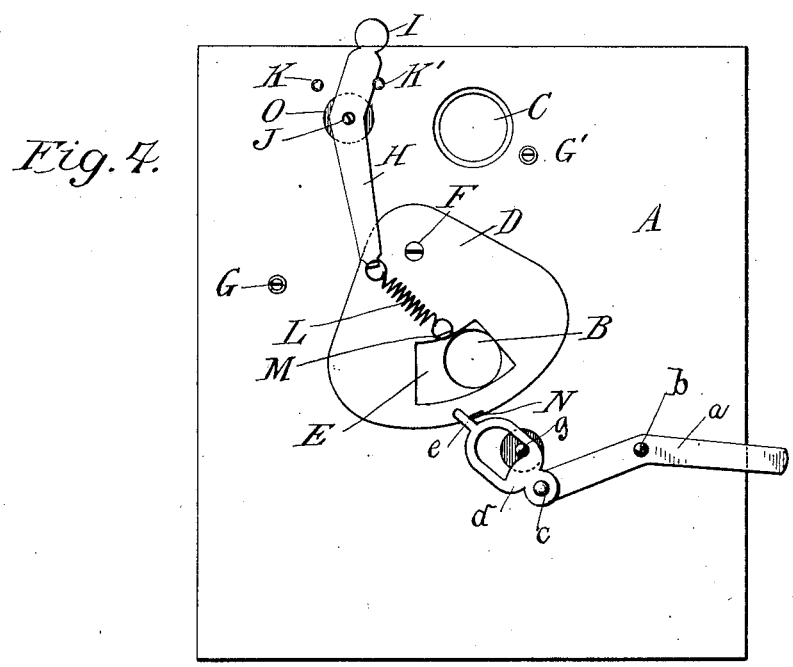

Figure 1 illustrates an elevation of the invention, the lens-opening being closed by the shutter and all the parts in an inactive position. Fig. 2 illustrates a like view of the invention, certain of the parts having been so moved that the shutter is about to operate. Fig. 3 illustrates a like view, the parts being shown in the position they occupy when the shutter has made a transit across the lens-opening and the parts have also assumed their second or alternative inactive position. Fig. 4 illustrates a view of the parts in one of the positions they occupy when the time-exposure mechanism is used.

This present application embodies improvements upon the shutter mechanism patented to me in and by United States Letters Patent No. 698,172, dated April 22, 1902, whereby the mechanism is greatly simplified and the cost reduced with equal efficiency in operation.

Referring to the drawings, A illustrates the front board of a camera or one side of a shutter-case, depending on construction. It may be made of any preferred material and of any preferred shape.

B is the lens-opening.

C is the finder-opening, if one be used. It forms no part of my invention.

D is the shutter-wing, having the usual opening E, which I prefer to make of the shape shown, for reasons well known.

F is a pivot, upon which the shutter oscillates.

G G' are two stops which limit the movement of the shutter-wing.

H is a lever, the end I of which projects through a slot in the camera or in the shutter-case, as the fact may be, whereby it may be manipulated from the exterior of the camera. This lever is pivoted at J.

K K' are two stops which limit the movement of the lever H.

L is a spring which connects the end of the lever H to a suitable point of attachment M on the shutter-wing.

As illustrated in Fig. 1, the upper end of the lever H has been pressed to the right, which has carried its lower end to the left, and the shutter has been swung from the position illustrated in Fig. 3 across the lens-opening B, so that that opening now rests under the solid parts of the shutter and light is excluded. It will be noted that the shutter-wing will be held in its present position indefinitely, because a straight line drawn through the center of the point of attachment M between the spring and the shutter and through the point of attachment of the spring and the lever H and through the center of the pivot J will fall to one side—to wit, the left of the pivot F, which is the center of movement of the shutter-wing—and that the stop G limits further movement of the shutter-wing. Consequently all the parts are at rest and will remain at rest in their present position until conditions are changed. Now to effect an exposure the lever H is moved by pressure against its projecting part, (marked I,) as shown in Fig. 2, so that it leaves the stop K' and moves toward the stop K, which causes the spring L to shift its line of pull until, as shown in Fig. 2, it passes to the opposite side—to wit, to the right side of the pivot F—whereupon as soon as the proper angle has been reached the shutter will quickly leave the position shown in Figs. 1 and 2 and make a transit of the lens-opening, assuming the position shown in Fig. 3, in which the lens-opening is shown covered by the shutter, but at the opposite side of the opening E from that shown in Figs. 1 and 2. The shutter in its new position is stopped by the stop G', as it was previously stopped by the stop G. The lever H is stopped by impact with the stop K, as it was previously stopped by impact against the stop K', and the straight line between the pivot J and the point of connection M, above referred to, has now been shifted, as shown in Fig. 3, to the right-hand side of the shutter-axis F, bearing the same relation that it formerly did when these parts were at the left of that axis. Now, therefore, the parts will remain in their present position indefinitely until conditions are again changed, and such a change is effected by simply moving the projecting end I of the lever H back again to its primary position, as shown in Fig. 1. It will thus be seen that by an exceedingly simple and inexpensive arrangement of the parts the shutter is made to traverse back and forth over the lens-opening.

For the purpose of effecting time exposures I provide a device, the same as illustrated in my said Letters Patent No. 698,172—that is to say, a lever $a$ is pivoted at $b$ and has pivoted to it at $c$ an open link $d$, which has a projecting forward finger $e$. The outer end of the lever $a$ (shown at $f$) projects beyond the side of the shutter-case. $g$ is a pin or small screw located within the opening of the link, which permits it to have the desired movement to right or left, as the case may be, when the link is moved inwardly, so that its projecting finger $e$ engages with a stud N on the shutter. By reason of this movement to the right or left the opening in the shutter is enabled to lie more immediately adjacent to the edge of the exposure-opening B as the shutter moves either to the right or left, as the case may be, thus effecting more accurate operation of the shutter.

O is a friction-washer, which is not essential, but may advantageously be used. It can be made in a variety of ways—as, for instance, of thin metal and in the form of a slightly-concave saucer, which will be slightly compressed by the pivot J, so that friction will be exerted upon the lever H in order that when the devices for time exposure are used the lever H will maintain the position at the extreme right or left and exert sufficient stress on the spring L to complete the transit of the shutter-wing when the means employed for the time exposure are withdrawn from contact with the wing.

It will be obvious to those who are familiar with this art that modifications may be made in the details of construction of the invention without departing from its essentials. I therefore do not limit myself to such details.

I claim—

In a photographic shutter the combination of a pivoted shutter-wing, a pivoted lever one end of which projects beyond and is adapted to be manipulated from the outside of the camera, a spiral spring connecting the other end of the lever with the shutter-wing, a friction device adapted to bear upon the lever, stops to limit the movement of the wing and other fixed stops to limit the movement of the lever.

In testimony whereof I have signed my name to this specification in the presence of two subscribing witnesses.

CARL BORNMANN.

Witnesses:
JOHN ELLIOTT,
W. TRUEMAN.